(12) United States Patent
Zhang

(10) Patent No.: US 9,960,623 B2
(45) Date of Patent: May 1, 2018

(54) CHARGING CIRCUIT AND MOBILE TERMINAL

(71) Applicant: Guangdong Oppo Mobile Telecommunications Corp., Ltd., Dongguan (CN)

(72) Inventor: Jialiang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 65 days.

(21) Appl. No.: 15/306,093

(22) PCT Filed: Jun. 1, 2015

(86) PCT No.: PCT/CN2015/080478
§ 371 (c)(1),
(2) Date: Oct. 23, 2016

(87) PCT Pub. No.: WO2016/192005
PCT Pub. Date: Dec. 8, 2016

(65) Prior Publication Data
US 2017/0149263 A1    May 25, 2017

(51) Int. Cl.
*H02J 7/00*   (2006.01)
*H02J 7/34*   (2006.01)

(52) U.S. Cl.
CPC .......... *H02J 7/0068* (2013.01); *H02J 7/0045* (2013.01); *H02J 7/345* (2013.01)

(58) Field of Classification Search
CPC ......... H02J 7/0068; H02J 7/0045; H02J 7/345

USPC .......................................................... 320/107
See application file for complete search history.

(56) References Cited

U.S. PATENT DOCUMENTS

| 5,892,351 A | 4/1999 | Faulk |
| 7,101,475 B1 * | 9/2006 | Maaske ................. E04H 4/1263 |
| | | 210/106 |
| 8,103,885 B2 * | 1/2012 | Sawyers ................... G06F 1/26 |
| | | 307/149 |

(Continued)

FOREIGN PATENT DOCUMENTS

| CN | 1977438 | 6/2007 |
| CN | 104221268 A | 12/2014 |

(Continued)

*Primary Examiner* — M'Baye Diao
(74) *Attorney, Agent, or Firm* — JMB Davis Ben-David

(57) ABSTRACT

The present disclosure proposes a charging circuit and a mobile terminal. The charging circuit includes: a first circuit, coupled to a charging port, to draw DC power signal, and convert the DC power signal into AC power signal; a second circuit, coupled to the battery, configured to receive the AC power signal from the first circuit, and convert the AC power signal into DC power signal for charging the battery; a capacitance coupling component, coupled between the first circuit and the second circuit. The capacitance coupling component is configured to block DC power signal from the first circuit. That is, the DC power signal fails to pass through the first circuit. Thus, the DC power signal flowing through the charging port does not flow to the second circuit and the battery directly when the first circuit malfunctions. Accordingly, the stability of the charging circuit is enhanced.

20 Claims, 3 Drawing Sheets

(56) References Cited

U.S. PATENT DOCUMENTS

| | | | |
|---|---|---|---|
| 8,358,103 B2 * | 1/2013 | Eastlack | H02J 7/025 |
| | | | 320/108 |
| 9,131,036 B2 * | 9/2015 | Gu | H02H 7/18 |
| 9,203,328 B2 * | 12/2015 | Freeman | H02M 3/33507 |
| 9,444,289 B2 * | 9/2016 | Park | H02J 17/00 |
| 9,548,628 B2 * | 1/2017 | Ben Aharon | H02J 1/108 |
| 2007/0241695 A1 | 10/2007 | Chang | |
| 2008/0278969 A1 | 11/2008 | Bolz et al. | |
| 2014/0375251 A1 | 12/2014 | Sakai et al. | |
| 2015/0054349 A1 | 2/2015 | Ishikuro et al. | |
| 2015/0098252 A1 | 4/2015 | Spinella | |
| 2015/0108945 A1 | 4/2015 | Yan et al. | |
| 2016/0087473 A1 | 3/2016 | Spinella | |
| 2016/0126787 A1 * | 5/2016 | Liao | H02J 9/005 |
| | | | 307/66 |

FOREIGN PATENT DOCUMENTS

| | | |
|---|---|---|
| CN | 104283262 A | 1/2015 |
| JP | 50-2119 | 1/1975 |
| JP | 2013187963 A | 9/2013 |
| TW | 200742491 A | 11/2007 |
| TW | 201351836 A | 12/2013 |
| TW | 201517455 A | 5/2015 |

* cited by examiner

CHARGING CIRCUIT AND MOBILE TERMINAL

CROSS-REFERENCE TO RELATED APPLICATIONS

This is the U.S. National Stage of International Application No. PCT/CN2015/080478, filed Jun. 1, 2015.

BACKGROUND OF THE DISCLOSURE

1. Field of the Disclosure

The present disclosure relates to field of mobile terminals, and more particularly, to a charging circuit and a mobile terminal.

2. Description of the Related Art

Since mobile terminals are widely popular, the suppliers pay more attention on battery charging of the mobile terminals.

FIG. 1 is a circuit diagram of a charging circuit used in a mobile terminal. The charging circuit, called a BUCK circuit, includes a metal oxide semiconductor (MOS) transistor, a control circuit, a diode, an inductor, and a battery. When the mobile terminal is charged, the control circuit controls the MOS transistor to alternatively turn on/off, so as to produce alternating current (AC) square wave signal. The square wave alternating current from the MOS transistor is first regulated by the inductor and then flows through the battery.

In conventional technology, there is a risk of the breakdown of the MOS transistor, which can result in that an overcurrent flows through the inductor, and the battery. Furthermore, the battery may be improperly charged to exceed the threshold voltage thereof, thereby causing a failure of the battery.

The failure of the MOS transistor may arise from the following aspects:

1. Improper operation of the MOS transistor caused by voltage applied across two terminals of the MOS transistor in excess of the threshold voltage, electrostatic breakdown, or surge current impact;

2. Poor quality of the MOS transistor or defects in manufacturing;

3. Other defects.

To solve the above-mentioned problem arised from the failure of the MOS transistor and to enhance the reliability of the charging circuit, the conventional solution is likely to increase an on-resistance $R_{DS(ON)}$ of the MOS transistor so as to improve a breakdown threshold voltage of the MOS transistor. However, high on-resistance $R_{DS(ON)}$ may cause heat accumulation of the MOS transistor due to current heating effect and a low power transmission efficiency of the charging circuit.

SUMMARY

An object of the present disclosure is to propose a charging circuit and a mobile terminal to enhance the reliability of the charging circuit of the mobile terminal.

In a first aspect of the present disclosure, a charging circuit connected between a charging port of a mobile terminal and a battery is provided. The charging circuit includes: a first circuit, coupled to the charging port, being configured to draw direct current (DC) power via the charging port from an electrical power source, and being configured to convert the direct current (DC) power flowing through the charging port to alternating current (AC) power; a second circuit, coupled to the battery, being configured to receive the alternating current (AC) power from the first circuit, and being configured to convert the alternating current (AC) power into direct current (DC) power to charge the battery; and a capacitance coupling component, coupled between the first circuit and the second circuit, being configured to pass the alternating current (AC) power signal but block the direct current (DC) power signal flowing from the first circuit to the second circuit. The capacitance coupling component is configured to couple the alternating current (AC) power signal from the first circuit to the second circuit when the first circuit is in a normal state and is configured to block off the direct current (DC) power signal flowing through the charging port and the first circuit when the first circuit is in a fault state due to malfunction.

According to an embodiment in conjunction to the first aspect of the present disclosure, the first circuit is configured to alternatively charge and discharge a capacitor of the capacitance coupling component through a switch transistor of the first circuit to convert direct current (DC) flowing through the charging port into alternating current (AC).

According to another embodiment in conjunction to the first aspect of the present disclosure or any one of the above embodiments, the first circuit includes a bridge circuit and a control circuit configured to control the bridge circuit, and the control circuit controls the operation of the bridge circuit for alternatively charging and discharging the capacitor.

According to another embodiment in conjunction to the first aspect of the present disclosure or any one of the above embodiments, the capacitor of the capacitance coupling component is a capacitor constructed from a printed circuit board (PCB) or a capacitor constructed from a flexible printed circuit (FPC).

According to another embodiment in conjunction to the first aspect of the present disclosure or any one of the above embodiments, size, shape, or thickness of the capacitor of the capacitance coupling component is alternatively designed to match with the structure of the charging circuit.

According to another embodiment in conjunction to the first aspect of the present disclosure or any one of the above embodiments, the first circuit includes a bridge circuit, and the bridge circuit includes a plurality of metal-oxide-semiconductor field-effect transistors (MOSFETs).

According to another embodiment in conjunction to the first aspect of the present disclosure or any one of the above embodiments, the second circuit includes a rectification circuit and a filter circuit.

In a second aspect of the present disclosure, a mobile terminal includes a charging port, a battery, and a charging circuit, as provided in any one of the above embodiments, which is being coupled between the charging port and the battery.

According to another embodiment in conjunction to the second aspect of the present disclosure, the charging port is a universal serial bus (USB) port.

According to another embodiment in conjunction to the second aspect of the present disclosure or any one of the above embodiments, the mobile terminal has a standard charging state which permits the flow of a normal charging current and a fast charging state which permits the flow of an increased charging current greater than the normal charging current.

In the embodiment of the present disclosure, direct current (DC) power signal flowing through the charging circuit is blocked with a capacitance coupling component; that is, direct current (DC) route does not exist. Thus, direct current (DC) power signal flowing through a charging port does not flow to the second circuit and the battery directly when a first circuit malfunctions. Accordingly, the stability of the charging circuit is enhanced.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF THE EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

Figure 1:
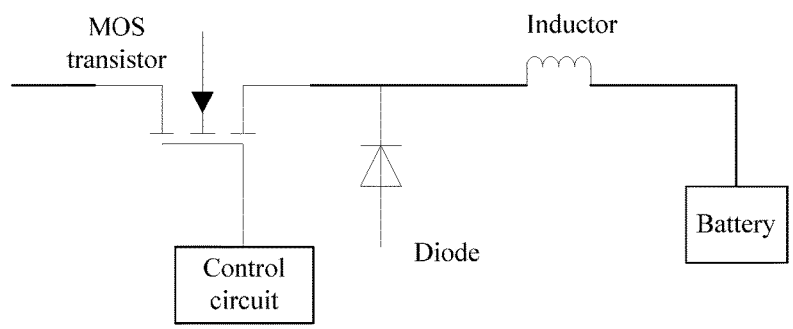
FIG. 1 is a block diagram of a charging circuit of a related art.
Figure 2:
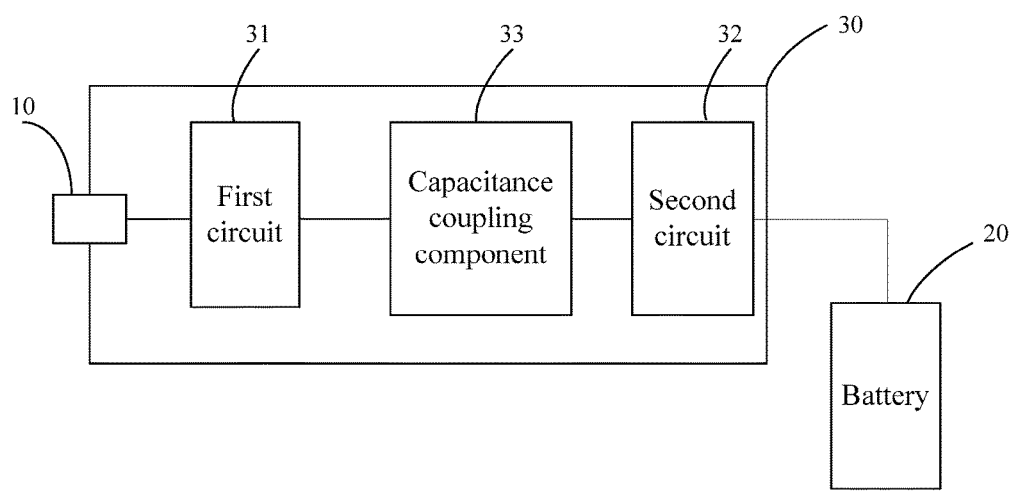
FIG. 2 is a block diagram of a charging circuit according to an embodiment of the present disclosure.

FIG. 2 is a block diagram of a charging circuit 30 according to an embodiment of the present disclosure. The charging circuit 30 illustrated in FIG. 2 is coupled between a charging port 10 of a mobile terminal and a battery 20. The charging circuit 30 includes the following components.

A first circuit 31 is coupled to the charging port 10. The first circuit 31 is configured to draw direct current (DC) power signal via the charging port 10 from an electrical power source and convert direct current (DC) power signal flowing through the charging port 10 to alternating current (AC) power signal.

A second circuit 32 is coupled to the battery 20. The second circuit 32 is configured to receive alternating current (AC) power signal from the first circuit 31 and convert alternating current (AC) power signal from the first circuit 31 into direct current (DC) power signal to charge the battery 20.

A capacitance coupling component 33, coupled between the first circuit 31 and the second circuit 32, is configured to pass alternating current (AC) power signal from the first circuit 31 to the second circuit 32 when the first circuit 31 is in a normal state and block off direct current (DC) power signal from the first circuit 31 when the first circuit 31 is in a fault state due to malfunction, e.g. the first circuit 31 is short circuited.

In this embodiment, direct current (DC) power signal flowing through the charging circuit is blocked with a capacitance coupling component; that is, direct current (DC) power signal fails to pass the capacitance coupling component. Thus, direct current (DC) power signal flowing through a charging port does not flow to the second circuit and the battery directly when a first circuit malfunctions. Accordingly, the stability of the charging circuit is enhanced.

The charging port 10 may be a universal serial bus (USB) port. The USB port may be a standard USB port or a micro USB port. In addition, the battery 20 may be a lithium battery.

The second circuit 32 is configured to adjust the current from the first circuit 31 to the charging current with which the battery 20 can be charged. The second circuit 32 includes a rectification circuit, a filter circuit, or a regulation circuit. The rectification circuit is either a diode rectification circuit or a triode rectification circuit. The detailed structure for rectification can use conventional technology, so the specification will not elaborate on it.

The second circuit 32 may be also configured to convert alternating current (AC) power signal from the first circuit 31 via the capacitance coupling component 33 to direct current (DC) power signal adapted to charge the battery 20.

The first circuit 31 can convert direct current (DC) power signal flowing through the charging port 10 into alternating current (AC) power signal by alternatively charging and discharging a capacitor of the capacitance coupling component 33. In other words, the first circuit 31 alternatively charges and discharges the capacitor of the capacitance coupling component 33 through specific control logic. When the control frequency of the control logic reaches a predetermined value, the first circuit 31 outputs alternating current (AC) power signal. The capacitor has a function of passing the AC current power signal and blocking the DC current power signal. Alternating current (AC) power signal is transmitted to the second circuit 32 through the capacitor.

Optionally, in at least one embodiment, the first circuit 31 is configured to alternatively charge and discharge the capacitor of the capacitance coupling component 33 through a switch transistor of the first circuit 31 to convert direct current (DC) power signal flowing through the charging port 10 into alternating current (AC) power signal.

In this embodiment, the switch transistor, such as an MOS transistor, is disposed in the first circuit 31. The switch transistor is prone to breakdown. When the switch transistor breakdowns, the first circuit fails to convert direct current (DC) power signal into alternating current (AC) power signal through the switch transistor. As a result, direct current (DC) power signal flowing through the charging port is applied on the subsequent components or battery 20 of the charging circuit directly. However, the capacitance coupling component 33 is coupled between the first circuit 31 and the second circuit 32 in this embodiment. The capacitance coupling component 33 blocks direct current (DC) power signal but permits AC power signal passing through. In other words, even if the switch transistor in the first circuit 31 breakdowns or malfunctions, direct current (DC) power signal flowing through the charging port 10 cannot flow to the second circuit 32 or the battery 20. In this way, safety of the charging circuit of the mobile terminal is ensured and enhanced.

In addition, the capacitance coupling component 33 performs function of blocking very well. The on-resistance $R_{DS(ON)}$ of the switch transistor of the first circuit 31 can be set at a very low value (unlike the conventional technology where breakdown voltage of the MOS transistor is increased by increasing the on-resistance $R_{DS(ON)}$ to further enhance reliability of the circuit), so it is not easy for the charging circuit to be overheated or damaged. On the other hand, the power transmittance of the charging circuit is greatly improved.

The first circuit 31 is not confined by this embodiment of the present disclosure. Number of the capacitors of the capacitance coupling component 33 is not limited. Additionally, the way of connecting the first circuit 31 and the capacitor of the capacitance coupling component 33 is not limited, either. For example, the first circuit 31 may be a half-bridge circuit or a full-bridge circuit. The capacitance coupling component 33 may include one or two capacitors. As long as the above-mentioned circuits and components and their connections realize that the capacitance coupling component 33 successfully transmit power to the second circuit 32, it is doable in the present disclosure. This embodiment of the present disclosure is detailed as follows.

Optionally, the first circuit 31 may include a bridge circuit and a control circuit. The control circuit is configured to control the bridge circuit. The control circuit controls the operation of the bridge circuit to alternatively charge and discharge the capacitor. For example, the first circuit 31 includes the half-bridge circuit, the capacitance coupling component 33, the first circuit 31, and the second circuit 32. The capacitance coupling component 33 includes a capacitor. The first circuit 31 and the second circuit 32 are grounded. The first circuit 31 is coupled between the capacitor of the capacitance coupling component 33 and the ground. The capacitor of the capacitance coupling component 33 are grounded via the battery 20 and the second circuit 32. Because the first circuit 31 controls the half-bridge circuit, the charge of the capacitor and discharge thereof to the ground can be realized. Or, the first circuit 31 includes the full-bridge circuit. The capacitance coupling component 33 includes two capacitors. The full-bridge circuit is coupled to the two capacitors. The first circuit 31 alternatively changes polarities of the voltage applied on the two capacitors by controlling the full-bridge circuit.

There are many ways to obtain power for the control circuit. For example, the charging current supplies the power, or the power source of the mobile terminal supplies the power.

Optionally, the capacitor of the capacitance coupling component 33 is a capacitor constructed from a printed circuit board (PCB) or a capacitor constructed from a flexible printed circuit (FPC) board. Optionally, size, shape, or thickness of the capacitor of the capacitance coupling component 33 is alternatively designed to match with the structure of the mobile terminal.

Specifically, the capacitor constructed from the PCB is specially fabricated by a PCB substrate and a copper foil on the PCB substrate. The capacitor constructed from the FPC is designed by the FPC. Advantages of the capacitor constructed from the PCB and the capacitor constructed from the FPC are that the capacitor can be arbitrarily shaped with any kind of shape, size, and thickness, and can even be arbitrarily shaped according to the structure and shape of terminals, such as cellphones.

Optionally, the first circuit 31 includes the bridge circuit. The bridge circuit includes a plurality of metal-oxide-semiconductor field-effect transistors (MOSFETs).

Optionally, the second circuit 32 can include the rectification circuit and the filter circuit.

Figure 3:
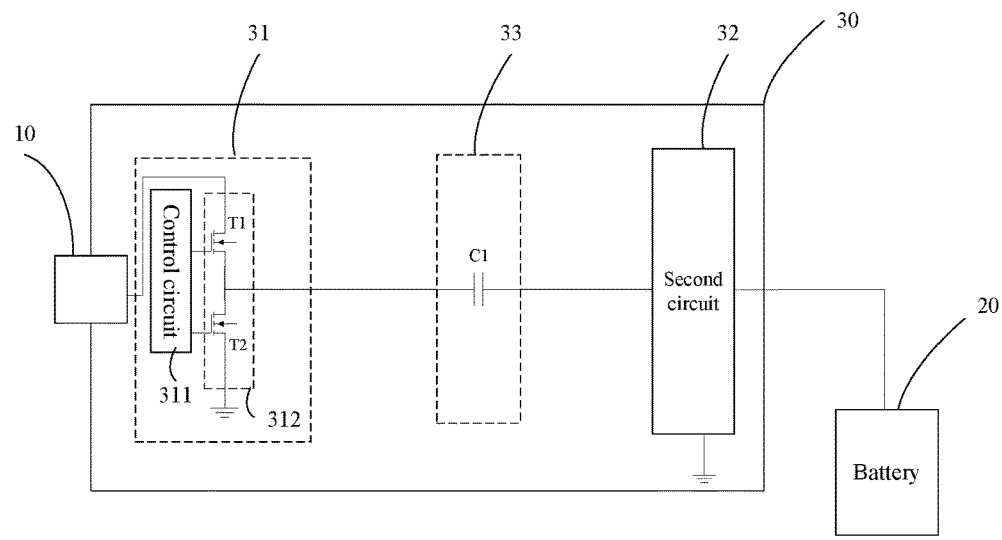
FIG. 3 is a circuit diagram of a charging circuit according to another embodiment of the present disclosure.
Figure 4:
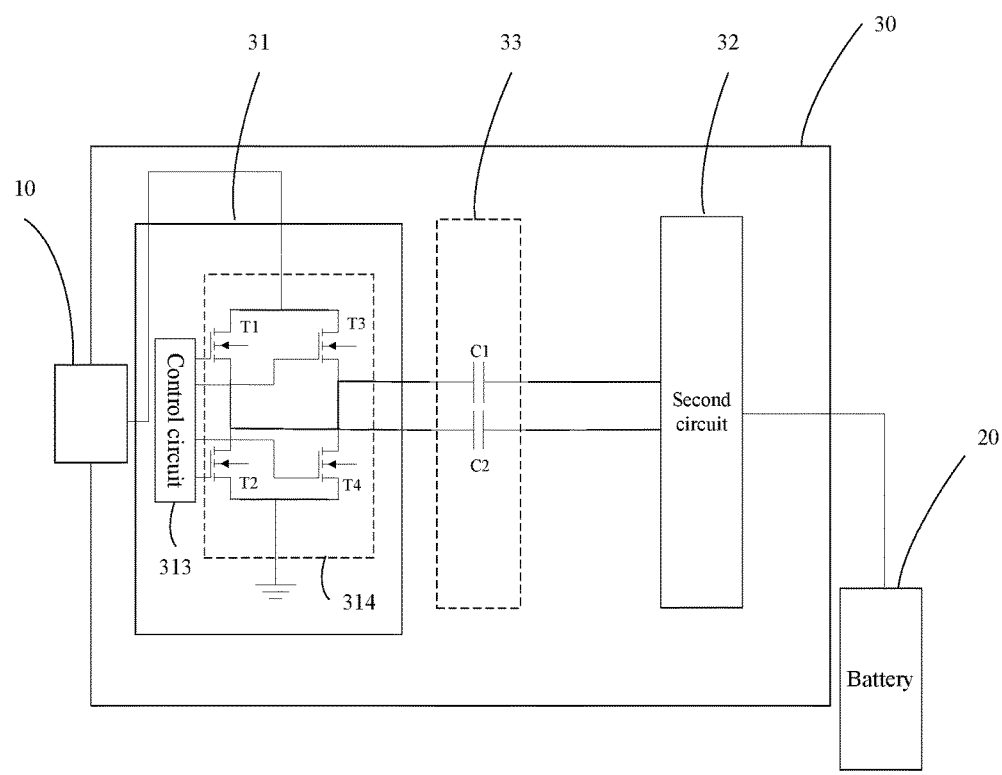
FIG. 4 is a circuit diagram of a charging circuit according to still another embodiment of the present disclosure.

This embodiment of the present disclosure is detailed with a specific example. It is understood that the example as shown in FIG. 3 and FIG. 4 is mainly used to assist one having ordinary skill in the art to understand the embodiment better rather than confining the figures and scenes shown or described in the embodiment. It is possible that the one having ordinary skill in the art can revise or modify the figures and scenes equivalently. These modifications and revisions are also in the scope of the present disclosure.

Please refer to FIG. 3. The first circuit 31 includes a control circuit 311 and a half-bridge circuit 312. The half-bridge circuit 312 includes a switch T1 and a switch T2. The capacitance coupling component 33 includes a capacitor C1. When being charged, the control circuit 311 controls the switch T1 and the switch T2 to alternatively charge and discharge the capacitor C1. In this way, direct current (DC) power signal is converted into alternating current (AC) power signal, and then alternating current (AC) power signal flows to the second circuit 32 and the battery 20 through the capacitor C1.

During charging, the control circuit 311 controls the switch transistor T1 to turn on and controls the switch transistor T2 to turn off. Meanwhile, direct current (DC) power signal from the charging port 10 flows through the switch T1 to charge the capacitor C1. Afterwards, the control circuit 311 controls the switch transistor T1 to turn off and controls the switch transistor T2 to turn on. Because the first circuit 31 and the second circuit 32 are grounded, the capacitor C1 discharges to ground. The control circuit 311 repeatedly controls the operation of the half-bridge circuit with the above-mentioned method to permit alternating current (AC) power signal flowing through the capacitor C1.

If the switch transistor of the half-bridge circuit 312 breakdowns, the capacitor C12 blocks off direct current (DC) power signal flowing through the charging port 10 to flow to the second circuit 32 and the battery 20 to further enhance reliability of the charging circuit.

Please refer to FIG. 4. The first circuit 31 includes a control circuit 313 and a full-bridge circuit 314. The full-bridge circuit 314 includes a switch transistor T1, a switch transistor T2, a switch transistor T3, and a switch transistor T4. The capacitance coupling component 33 includes a capacitor C1 and a capacitor C2. In the process of charging, the control circuit 313 controls the switch transistor T1 and the switch transistor T4 and then the switch transistor T2 and the switch transistor T4 and alternatively changes the polarities of the voltage applied on the capacitor C1 and the capacitor C2 to convert direct current (DC) power signal into alternating current (AC) power signal. Then, alternating current (AC) power signal flows to the second circuit 32 and the battery 20 through the capacitor C1 and the capacitor C2.

Specifically, when charging, the control circuit 311 controls the switch transistor T1 and the switch transistor T4 to turn on and controls the switch transistor T2 and the switch transistor T3 to turn off. At this time, direct current (DC) power signal from the charging port 10 flows through the switch transistor T1, the capacitor C2, the capacitor C1, and the switch transistor T4 to form a loop. Afterwards, the control circuit 311 controls the switch transistor T1 and the switch transistor T4 to turn off and controls the switch transistors T2 and T3 to turn on. At this time, direct current (DC) power signal from the charging port 10 flows through the switch transistor T3, the capacitor C1, the capacitor C2, the switch transistor T2, and the ground to form a loop. The control circuit 311 repeatedly controls operation of the full-bridge circuit with the above-mentioned method to have alternating current (AC) power signal flowing through the capacitor C1 and the capacitor C2.

If the switch transistor in the full-bridge circuit 314 breakdowns, the capacitor C1 and the capacitor C2 will block off direct current (DC) power signal flowing through the charging port 10 to flow to the second circuit 32 and the battery 20 to further enhance reliability of the charging circuit.

Figure 5:
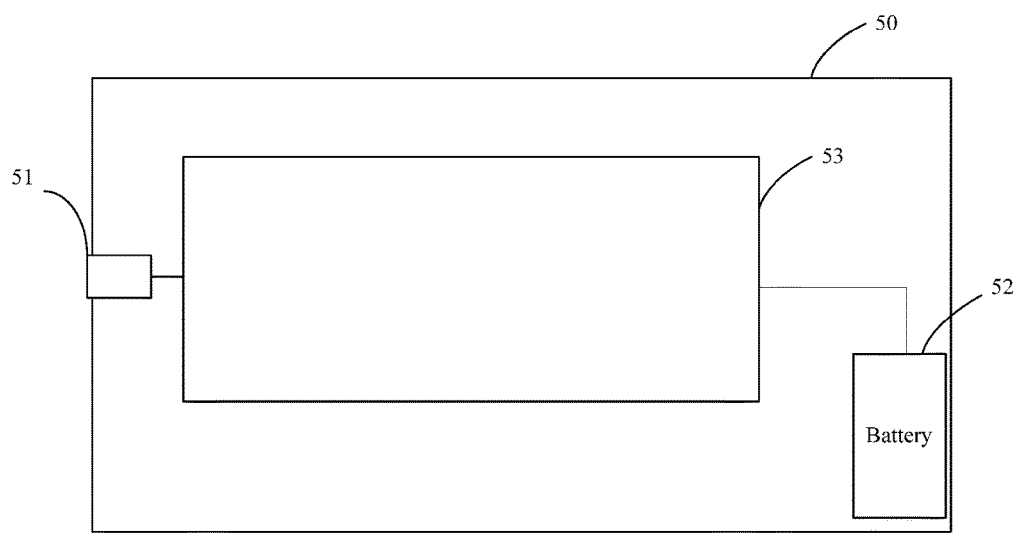
FIG. 5 is a block diagram of a mobile terminal according to an embodiment of the present disclosure.

FIG. 5 is a block diagram of a mobile terminal 50 according to an embodiment of the present disclosure. The mobile terminal 50 includes a charging port 51, a battery 52, and a charging circuit 53. The charging circuit 53 may be any one of the above-mentioned charging circuits 30.

In this embodiment, direct current (DC) power signal flowing through the charging circuit is blocked with a capacitance coupling component; that is, direct current (DC) power signal fails to pass through the capacitance coupling component. Thus, direct current (DC) power signal from a charging port does not flow to the second circuit and the battery directly when a first circuit malfunctions. Accordingly, the stability of the charging circuit is enhanced.

Optionally, the charging port 51 is a USB port.

Optionally, the mobile terminal 50 has a standard charging state and a fast charging state which permits the flow of an increased charging current greater than the normal charging current of the standard state.

It is understood that the breakdown of the MOS transistor is obviously serious issue in a mobile terminal with a function of fast charging. However, for the mobile terminal 50 proposed by the present disclosure, it is not a problem that the circuits are unreliable due to the breakdown of the fast-charging MOS transistor.

According to an embodiment of the present disclosure, a charging circuit configured to draw DC current for charging a battery. The charging circuit includes:

a first circuit, coupled to the DC power signal, being configured to draw direct current (DC) power signal from an electrical power source, and being configured to convert the direct current (DC) power signal flowing through the charging port to alternating current (AC) power;

a second circuit, coupled to the battery, being configured to receive the alternating current (AC) power from the first circuit, and being configured to convert the alternating current (AC) power into direct current (DC) power to charge the battery;

a capacitance coupling component, coupled between the first circuit and the second circuit, being configured to pass the alternating current (AC) power signal from the first circuit to the second circuit when the first circuit works normally but block the direct current (DC) power signal flowing from the first circuit to the second circuit when the first circuit fails to generate alternating current (AC) power signal due to malfunction of the first circuit.

In the embodiment of the present disclosure, direct current (DC) power signal flowing through the charging circuit is blocked by the capacitance coupling component. That is, the direct current (DC) power signal does not flow to the battery directly. When the first circuit malfunctions, direct current (DC) power signal flowing through the charging port is blocked by the capacitance coupling component 33 to prevent the battery from being damaged.

Optionally, the first circuit is configured to alternatively charge and discharge a capacitor of the capacitance coupling component through a switch transistor of the first circuit and to convert direct current (DC) power signal flowing through the charging port into alternating current (AC) power signal.

Optionally, the first circuit includes a bridge circuit and a control circuit configured to control the bridge circuit. The control circuit controls the operation of the bridge circuit to realize alternate charging and discharging of the capacitor.

Optionally, the capacitor of the capacitance coupling component is a capacitor constructed from a printed circuit board (PCB) or a capacitor constructed from a flexible printed circuit (FPC).

Optionally, the first circuit includes a bridge circuit, and the bridge circuit includes a plurality of metal-oxide-semiconductor field-effect transistors (MOSFETs).

Optionally, the second circuit includes a rectification circuit and a filter circuit.

Optionally, the charging circuit is applied in a mobile terminal. Moreover, size, shape, or thickness of the capacitor of the capacitance coupling component is alternatively designed to match with the structure of the mobile terminal.

The one having ordinary skill in the art understand that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. The one having ordinary skill in the art can use different ways to realize the function for each specific application while such realizations should not go beyond the scope of the present disclosure.

It is understood by the one having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A charging circuit, coupled between a charging port of a mobile terminal and a battery, comprising:
   a first circuit, coupled to the charging port, being configured to draw direct current (DC) power via the charging port from an electrical power source, and being configured to convert the direct current (DC) power signal flowing through the charging port to alternating current (AC) power signal;
   a second circuit, coupled to the battery, being configured to receive the alternating current (AC) power signal from the first circuit, and being configured to convert the alternating current (AC) power signal into direct current (DC) power signal to charge the battery;
   a capacitance coupling component, coupled between the first circuit and the second circuit, being configured to pass the alternating current (AC) power signal but block the direct current (DC) power signal flowing from the first circuit to the second circuit;
   wherein the capacitance coupling component is configured to couple the alternating current (AC) power signal from the first circuit to the second circuit when the first circuit is in a normal state and is configured to block off the direct current (DC) power signal flowing through the charging port and the first circuit when the first circuit is in a fault state due to malfunction.

2. The charging circuit of claim 1, wherein the first circuit is configured to alternatively charge and discharge a capacitor of the capacitance coupling component through a switch transistor of the first circuit to convert direct current (DC) flowing through the charging port into alternating current (AC).

3. The charging circuit of claim 2, wherein the first circuit comprises a bridge circuit and a control circuit configured to control the bridge circuit, and the control circuit controls the operation of the bridge circuit for alternatively charging and discharging the capacitor.

4. The charging circuit of claim 3, wherein the bridge circuit is a half-bridge circuit.

5. The charging circuit of claim 3, wherein the bridge circuit is a full-bridge circuit.

6. The charging circuit of claim 1, wherein the capacitor of the capacitance coupling component is a capacitor constructed from a printed circuit board (PCB) or a capacitor constructed from a flexible printed circuit (FPC).

7. The charging circuit of claim 1, wherein size, shape, or thickness of the capacitor of the capacitance coupling component is alternatively designed to match with the structure of the mobile terminal.

8. The charging circuit of claim 1, wherein the first circuit comprises a bridge circuit, and the bridge circuit comprises a plurality of metal-oxide-semiconductor field-effect transistors (MOSFETs).

9. The charging circuit of claim 1, wherein the second circuit comprises a rectification circuit and a filter circuit.

10. A mobile terminal, comprising:
    a charging port;
    a battery; and
    a charging circuit, coupled between the charging port and the battery, comprising:
    a first circuit, coupled to the charging port, being configured to draw direct current (DC) power via the charging port from an electrical power source, and being configured to convert the direct current (DC) power signal flowing through the charging port to alternating current (AC) power signal;
    a second circuit, coupled to the battery, being configured to receive the alternating current (AC) power signal from the first circuit, and being configured to convert the alternating current (AC) power signal into direct current (DC) power signal to charge the battery;
    a capacitance coupling component, coupled between the first circuit and the second circuit, being configured to pass the alternating current (AC) power signal but block the direct current (DC) power signal flowing from the first circuit to the second circuit;
    wherein the capacitance coupling component is configured to couple the alternating current (AC) power signal from the first circuit to the second circuit when the first circuit is in a normal state and is configured to block off the direct current (DC) power signal flowing through the charging port and the first circuit when the first circuit is in a fault state due to malfunction.

11. The mobile terminal of claim 10, wherein the first circuit is configured to alternatively charge and discharge a capacitor of the capacitance coupling component through a switch transistor of the first circuit to convert direct current (DC) flowing through the charging port into alternating current (AC).

12. The mobile terminal of claim 11, wherein the first circuit comprises a bridge circuit and a control circuit configured to control the bridge circuit, and the control circuit controls the operation of the bridge circuit for alternatively charging and discharging the capacitor.

13. The mobile terminal of claim 12, wherein the bridge circuit is a half-bridge circuit.

14. The mobile terminal of claim 12, wherein the bridge circuit is a full-bridge circuit.

15. The mobile terminal of claim 10, wherein the capacitor of the capacitance coupling component is a capacitor constructed from a printed circuit board (PCB) or a capacitor constructed from a flexible printed circuit (FPC).

16. The mobile terminal of claims 10, wherein size, shape, or thickness of the capacitor of the capacitance coupling component is alternatively designed to match with the structure of the mobile terminal.

17. The mobile terminal of claim 10, wherein the first circuit comprises a bridge circuit, and the bridge circuit comprises a plurality of metal-oxide-semiconductor field-effect transistors (MOSFETs).

18. The mobile terminal of claim 10, wherein the second circuit comprises a rectification circuit and a filter circuit.

19. The mobile terminal of claim 10, wherein the charging port is a universal serial bus (USB) port.

20. The mobile terminal of claim 10, wherein the mobile terminal has a standard charging state which permits the flow of a normal charging current and a fast charging state which permits the flow of an increased charging current greater than the normal charging current.

* * * * *